(12) United States Patent
Fisher et al.

(10) Patent No.: US 8,983,936 B2
(45) Date of Patent: Mar. 17, 2015

(54) INCREMENTAL VISUALIZATION FOR STRUCTURED DATA IN AN ENTERPRISE-LEVEL DATA STORE

(75) Inventors: Danyel A. Fisher, Seattle, WA (US); Arnd Christian König, Kirkland, WA (US); Steven M. Drucker, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/439,563

(22) Filed: Apr. 4, 2012

(65) Prior Publication Data
US 2013/0268520 A1 Oct. 10, 2013

(51) Int. Cl.
G06F 17/30 (2006.01)
(52) U.S. Cl.
CPC .... *G06F 17/30477* (2013.01); *G06F 17/30554* (2013.01)
USPC .......................................... 707/722
(58) Field of Classification Search
USPC .......................... 707/714, 718, 776, 722, 768
See application file for complete search history.

(56) References Cited

U.S. PATENT DOCUMENTS

| | | | |
|---|---|---|---|
| 6,503,195 B1 | 1/2003 | Keller et al. | |
| 7,182,465 B2 | 2/2007 | Fuchs et al. | |
| 7,385,708 B2 | 6/2008 | Ackerman et al. | |
| 7,728,868 B2 | 6/2010 | Razzaque et al. | |
| 8,572,068 B2 * | 10/2013 | Graefe et al. | 707/718 |
| 2006/0031209 A1 | 2/2006 | Ahlberg et al. | |
| 2006/0106793 A1 * | 5/2006 | Liang | 707/5 |
| 2007/0016612 A1 * | 1/2007 | James et al. | 707/104.1 |
| 2007/0226178 A1 * | 9/2007 | Ewen et al. | 707/2 |
| 2008/0072180 A1 * | 3/2008 | Chevalier et al. | 715/861 |
| 2008/0077530 A1 * | 3/2008 | Banas et al. | 705/50 |
| 2008/0306919 A1 * | 12/2008 | Iwayama et al. | 707/3 |
| 2010/0268067 A1 | 10/2010 | Razzaque et al. | |
| 2011/0047120 A1 * | 2/2011 | Kamvar et al. | 706/50 |
| 2011/0167110 A1 * | 7/2011 | Hoffberg et al. | 709/203 |
| 2011/0258183 A1 * | 10/2011 | Gibbs et al. | 707/723 |
| 2011/0314021 A1 * | 12/2011 | Gibbs et al. | 707/737 |
| 2012/0047125 A1 * | 2/2012 | Day et al. | 707/714 |
| 2012/0089642 A1 * | 4/2012 | Milward et al. | 707/776 |

(Continued)

OTHER PUBLICATIONS

Fisher et al.; "Trust Me, I'm Partially Right: Incremental Visualization Lets Analysts Explore Large Datasets Faster", published via Internet on Mar. 2, 2012; Association for Computing Machinery (ACM) CHI 2012, Austin, Texas, May 5-12, 2012; "Retrieved from http://eprints.soton.ac.uk/273149/1/chi2012_interactive.pdf" on Apr. 9, 2012.

(Continued)

*Primary Examiner* — Cam-Linh Nguyen
(74) *Attorney, Agent, or Firm* — Sandy Swain; Brian Haslam; Micky Minhas

(57) ABSTRACT

The subject disclosure is directed towards simulating query execution to provide incremental visualization for a global data set. A data store may be configured for searching at least a portion of a global data set being stored at an enterprise-level data store. In response to a user-issued query, partial query results are provided to a front-end interface for display to the user. The front-end interface also provides statistical information corresponding to the partial query results in relation to the global data set, which may be used to determine when a current set of query results becomes acceptable as a true/accurate estimate.

20 Claims, 6 Drawing Sheets

(56) References Cited

U.S. PATENT DOCUMENTS

| | | | |
|---|---|---|---|
| 2012/0158708 A1* | 6/2012 | Gillet et al. | 707/723 |
| 2013/0030860 A1* | 1/2013 | Chaubey et al. | 705/7.27 |
| 2013/0117257 A1* | 5/2013 | Meijer et al. | 707/719 |
| 2013/0124097 A1* | 5/2013 | Thorne | 702/11 |

OTHER PUBLICATIONS

Fisher et al.; "Incremental, Approximate Database Queries and Uncertainty for Exploratory Visualization"; in IEEE Symposium on Large Data Analysis and Visualization, IEEE, Oct. 23, 2011; Retrieved from "http://research.microsoft.com/pubs/153555/fisher.pdf" on Apr. 9, 2012.

Piringer et al.; "A Multi-Threading Architecture to Support Interactive Visual Exploration"; In IEEE Transactions on Visualization and Computer Graphics (2009), vol. 15, Issue: 6, Publisher: IEEE, pp. 1113-1120 Nov.-Dec.; published via Internet on Oct. 11, 2009.

Cottam et al.; "Bit by Bit: Incremental Data Visualization", Published Oct. 19, 2008 via Internet; IEEE Symposium on Information Visualization, 2009; Retrieved from "http://www.cs.indiana.edu/~jcottam/pubs/InfoVis09-BitByBit.pdf" on Apr. 1, 2012.

Garrett et al.; "Real-Time Incremental Visualization of Dynamic Ultrasound Volumes Using Parallel BSP Trees"; Department of Computer Science, University of North Carolina at Chapel Hill; Published in IEEE Visualization '96 Proceedings held Oct. 27-Nov. 1, 1996, pp. 235-240; downloaded from "http://www.cs.unc.edu/~whitton/ExtendedCV/Papers/1996-Viz-Garrett.pdf" on Apr. 1, 2012.

Deligiannidis et al.;"User-Centered Incremental Data Exploration and Visualization"; LSDIS Lab and Computer Science, The University of Georgia; Published Year: 2008; Downloaded from "http://lsdis.cs.uga.edu/projects/semvis/PGV/PGV.pdf" on Apr. 1, 2012.

Streit et al.; "A Spreadsheet Approach to Facilitate Visualization of Uncertainty in Information"; IEEE Transactions on Visualization and Computer Graphics; vol. No. 14, Issue No. 1: pp. 61-72. Jan. 2008; Retrieved from "http://www.cs.jhu.edu/~misha/ReadingSeminar/Papers/Streit07.pdf" on Apr. 10, 2012.

* cited by examiner

INCREMENTAL VISUALIZATION FOR STRUCTURED DATA IN AN ENTERPRISE-LEVEL DATA STORE

CROSS REFERENCE TO RELATED APPLICATIONS

This application is related to U.S. patent application Ser. No. 13/439,650 entitled "Visualization of Changing Confidence Intervals".

BACKGROUND

Due to technological innovations in data storage capacity, current enterprises try to capture and store as much data as possible when conducting enterprise-level activities. The rate and richness (e.g., depth) at which this data may be searched and/or manipulated may be inhibited by costs related to executing enterprise-level data processing tasks (e.g., queries) over enterprise-level data stores (e.g., over a terabyte in storage memory space). These tasks often consume a considerable portion of total processing time and/or available computing resources, which can encumber enterprise productivity. It is impractical, for example, to delay other information technology processes and/or wait overnight for database queries to conclude and for results to return. While present day enterprises routinely fund projects toward building, updating and maintaining large-scale data stores (e.g., database systems), these enterprise desire better efficiency without adding significant computing infrastructure.

Instead of submitting the database queries as batch jobs and waiting for a response, conventional large-scale data stores may accelerate database query execution and/or a related statistical analysis using any known incremental query execution technique. For instance, by generating incomplete query responses at an initial iteration and incrementally updating the incomplete query responses at each subsequent iteration until a final, complete response is produced, a user may view the progression of incomplete query responses when, after each iteration, updated query response data is rendered on a computer display.

Various visualization mechanisms permit monitoring of incremental query execution on structured enterprise data that is maintained across numerous storage systems. Present day enterprise-level systems implementing such mechanisms also may present statistical data that summarizes the structured enterprise data and/or expresses comparison results between portions of the structured enterprise data through, for example, histogram or chart representations. Some systems provide histograms conveying statistical data that is based upon hypothetical results. Because these hypothetical results do not accurately reflect actual results from the enterprise-level data store, engineers cannot use the hypothetical results to derive meaningful insight for improving the enterprise-level systems.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards facilitating enterprise-scale front end interaction that drives query execution simulation. According to one aspect, determining when a set of query results becomes actionable/credible may reduce or eliminate productivity costs and increase user satisfaction. To determine whether a given data store can generate partial query results that can able to contribute to the enterprise-level activities/decisions as a reliable and useful source of decisional information, a simulation mechanism may execute queries over incremental samples, at least in part, and monitor user interactions with a front-end interface in response to each iteration of the partial query results. The simulation mechanism may determine, for example, that the user accepted the partial query results as a true or near true estimate of full query results.

Based on the user interactions, the partial query results may qualify as sufficiently credible to make real-time or near real-time decisions, especially decisions regarding query execution. Some of these decisions may be directed towards terminating an actual, real-world query execution process, prior to completion, to accelerate the query execution process. The partial query results also may facilitate exploration of the enterprise-level data store. The user may be capable of deepening a search with more data sets and/or expanding a query with more commands, dimensions and/or measurements. The partial query results also enable interaction with visualizations associated with presenting the partial query results at different iterations.

In one aspect, incremental visualization systems implementing the simulation mechanism, as described herein, provide an enhanced (front-end) interface to a data store that emulates the enterprise-level data store. The enhanced interface may present a set of visual representations and capture user activity related data. The enhanced interface monitors user interactions with the set of visual representations and trains probabilistic model data for predicting future user activity when executing queries with the actual enterprise-level data store. Developing/testing the enhanced front-end interfaces that use and display incremental queries may be a precursor to building a complete enterprise-level system that provides incremental query results.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
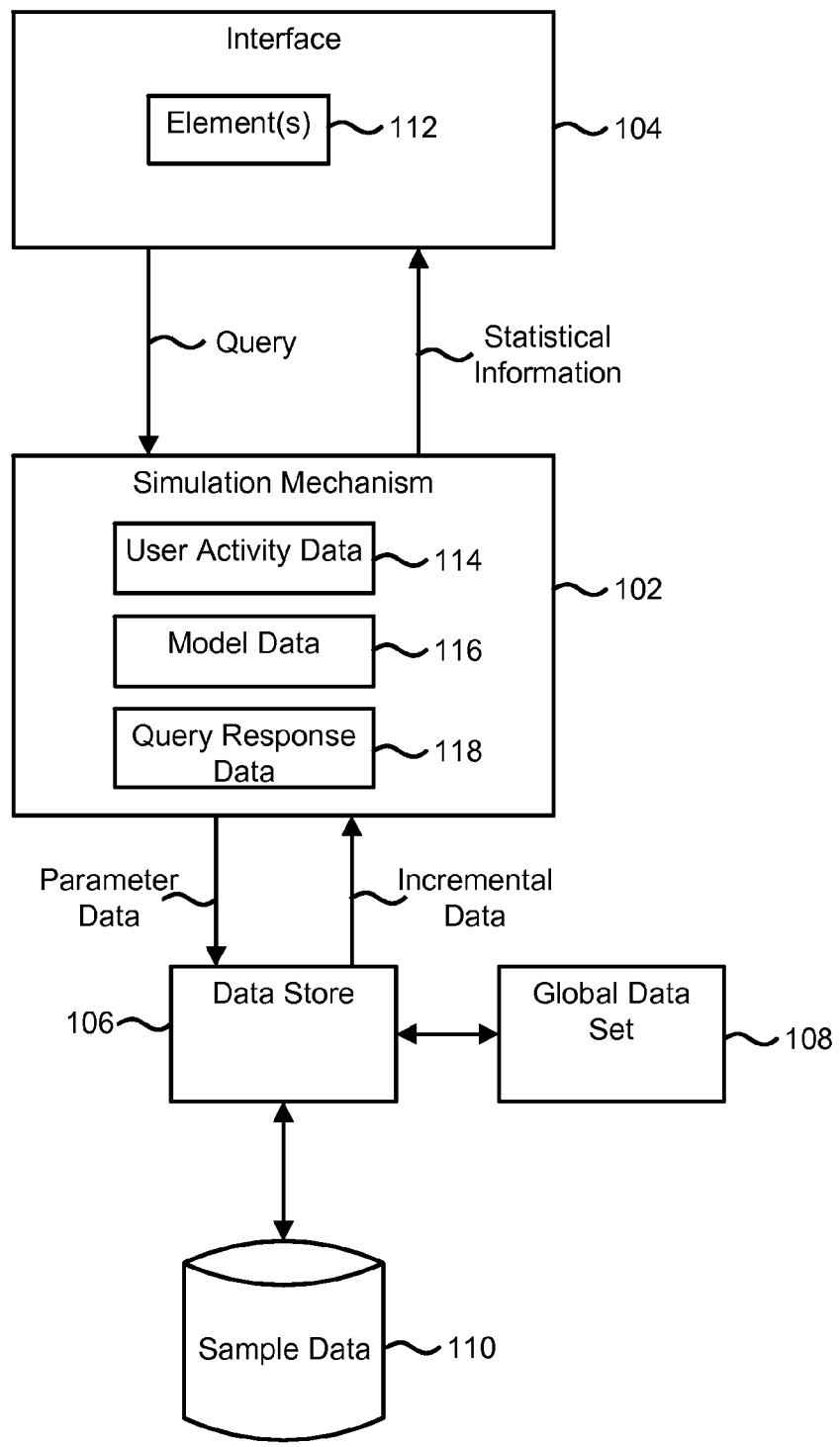
FIG. 1 is a block diagram illustrating an example system for enabling incremental visualization simulation for structured data according to one example implementation.

Various aspects of the technology described herein are generally directed towards query execution simulation for incremental visualization of a data set. According to one example implementation, data processing tasks commonly known as queries may be executed against structured enterprise data representing at least a portion of the data set, which itself may comprise a portion of a larger data set stored in an enterprise-level data store (e.g., a cloud-based data store, a local/network database and/or the like). It is appreciated that "query" refers a wide range of data processing tasks. For instance, an example query may include a multi-dimensional histogram query, a distributed query, non-structured database query and so forth.

As mentioned above, executing such queries over a conventional large-scale enterprise-level data store incurs considerable computing resource/time related costs that limit a rate at which the updated query response data is provided to the user. These costs also constrain the scope of a statistical analysis being performed on the updated query response data. The related costs also can impede or even terminate current improvement projects and/or render potential avenues of improvement unfeasible due to prohibitive expenses. Reducing and/or eliminating these costs may involve determining when a set of query results may be considered statistically accurate and/or credible as described herein.

Rather than using a real-world or production enterprise-level data store, the queries may be executed, at least in part, against a portion of the structured enterprise data stored in another data store (e.g., a local database), which may be referred to as a back-end data store. When presenting query results to the user, visual representations of these results and/or any associated statistical data may be incrementally rendered on an interface, which may be referred to as a front-end interface.

During the incremental visualization of the query results, a simulation mechanism may enable a qualitative examination of user interactions with visualizations for expressing uncertainty statistics on a computer display. These visualizations may refer to a particular data set that is updated over time with sample data from a global data set. Query execution against the particular data set may periodically produce incremental data for current query results. Over time, the simulation mechanism also may determine incremental data uncertainty. One example application of the simulation mechanism is to comparing database query responses compromising the incremental data with prior estimates of the uncertainty statistics that were based on a previous set of query results.

Sampling the structured enterprise data may enable the back-end data store to emulate the enterprise-level data store when replying to queries with partial results during incremental visualization. According to one example implementation, the back-end data store may be configured to function similar to a cloud computing environment that incrementally executes queries across many storage machines. The back-end data store virtualizes the distributed query execution by communicating query results data that emulate real query responses from the cloud computing environment. Eventually, the back-end data store returns a full or substantially full set of results after concluding a complete or substantially complete search of the data set and/or when a sample size exceeds a minimum threshold number of a data items.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and query processing in general.

FIG. 1 is a block diagram illustrating an example system for simulating query execution to enable incremental visualization for structured data in an enterprise-level data store according to one example implementation. Various components of the example system may include a simulation mechanism 102 being configured to provide an interface 104 for operating a data store 106 that controls access to at least a portion of the global data set 108. The data store 106 supports the simulation mechanism 102 with data processing/storage resources. In one example implementation, the simulation mechanism 102 may identify one or more representative samples of the global data set 108, which are extracted and stored as sample data 110. The sample data 110 may alternatively include pre-populated representative samples comprising a portion of structured enterprise data from which the simulation mechanism 102 may approximate query responses using partial results and/or estimated full results as described below.

The simulation mechanism 102 may store the sample data 110 in a randomized ordering, which enables the extraction of representative, unbiased samples, by querying a portion (e.g., a first few thousand rows) of the full global data set 108. To emulate incremental query results from the enterprise-level data store, the simulation mechanism 102 may instruct the data store 106 to repeat query execution with an increasing sample size.

According to one example implementation, the simulation mechanism 102 may display the approximated query responses in the form of graphical user interface elements 112 (hereinafter, referred to as the elements 112) including visual representations of tabular structures presenting the partial results, histograms depicting statistical information corresponding to the partial results and/or the like. The elements 112 facilitate interpretation of the statistical information to benefit those working with incremental visualization systems who desire efficient data processing that is also interactive, especially with respect to database query execution against enterprise-level data stores. By iteratively displaying the results data, the elements 112 also facilitate exploratory searching of the structured enterprise data.

The simulation mechanism 102 may be implemented as a software and/or hardware component running over a shared database system comprising, for example, a few million rows (e.g., table rows) of pre-populated, pre-sampled data from a global data set. Via the interface elements 112, the user may issue queries to the simulation mechanism 102, which returns relevant statistical information (e.g., mean values, standard deviations/variances, aggregated counts and/or the like). The simulation mechanism 102 also may compute additional statistical properties, such as population (e.g., full data set) measurement estimates, uncertainty statistics, full query result predictions, error bounds and/or the like. The simulation mechanism 102 communicates a stream of query responses, at a user-specified frequency, until of the appropriate statistical data has been displayed.

It is appreciated that the example system components depicted for FIG. 1 are not the only embodiments envisioned by the present disclosure; other component configurations may be configured to emulate enterprise-level data stores when monitoring user interactions with the elements 112. To illustrate, the simulation mechanism 102 may be portrayed as a software component that may run at a user computer, at the data store 106 and/or on any computer in between the user computer and the data store 106. While a single software component implementation may be used, other example implementations of the simulation mechanism 102 may comprise a first software component and a second software component. For example, the first software component may run at the user computer alongside the interface 104. The second software component communicably couples to the data store 106 and may run anywhere including the user computer, the data source 106, an intermediate computing device, a proxy computer and/or the like. Implementations in which more than two software components, such as a system of software/hardware components, coordinate the query simulation also may be feasible in some embodiments of FIG. 1 and/or alternatives thereto.

The simulation mechanism 102 instructs the interface 104 to produce visual representations of data set confidence bounds/intervals according to one example implementation. The simulation mechanism 102 may enable the computation and/or visualization of data set uncertainty across any number of dimensions, including value accuracy, data set structure, visual representation quality, provenance in the front-end interface and/or the like. The interface 104 may present the confidence bounds through one or more visual representations, such as error bars. It is appreciated that the present disclosure envisions other embodiments in which different visual representation techniques may be employed to display incremental data. Incremental uncertainty visualization may comprise one example set of representation techniques that includes error bars, translucent materials, fuzzy regions and/or other well-known visual representation techniques.

According to one example implementation, the simulation mechanism 102 may be configured to analyze user activity data 114 captured during the query execution simulation in addition to any query related results data. The user activity data 114 may describe user interactions with the interface elements 112 during the incremental visualization. As an example, the simulation mechanism 102 may record the user activity data 114 whenever the user activates/utilizes one of the interface elements 112. Users, who issue exploratory queries, as an example, often search multiple data sets at one time and/or simultaneously view different sets of the query related results data. These users may also review incremental modifications to a particular set of partial results by iterating through a progression of visual representations. In contrast, when examining a set of visual representations configured to display reports or presentations, the same users typically focus on one visual representation.

Based upon various parameter data, according to one example implementation, the simulation mechanism 102 may configure the data store 106 for searching. Hence, the various parameter data may ultimately control the query execution simulation and/or subsequent incremental visualization. Example (search) parameters may include, but are not limited to, maximum storage space capacity, total available memory, structured data set size (e.g., an amount of actual stored data), hard disk I/O speed (e.g., number of rows read per second), network bandwidth, communication latency and/or the like. The parameter data also may identify an appropriate operating mode for displaying visual representations of a current set of results via the interface 104. Example (visualization) parameters may specify a rate and/or a time period at which the simulation mechanism 102 provides query related results data (e.g., a partial result) to the interface 104, which presents an appropriate visual representation to the user. The simulation mechanism 102, in light of the user activity data 114, may calibrate at least a portion of the parameter data (e.g., data processing variables such as latency and lag), such that the example system configures the data store 106 to perform searches (e.g., incremental searches) that result in the most user interactions.

According to one example implementation, the example system described for FIG. 1 may enable visual query/search formulation. Via the interface 104, the user may visually define a query/search to which the simulation mechanism 102 responds with a partial query result being conveyed through a bar chart and/or confidence bounds. Between iterations, the simulation mechanism 102 may increase representative sample size, narrow confidence bound intervals and/or improve representative sample accuracy in order to provide more precise results data at a subsequent iteration.

By using an appropriate analytic metric and/or a variation thereof, the simulation mechanism 102 may compute estimates of the statistical information, such as confidence bounds, margins of errors and/or the like, using information associated with the sample data 110 and/or the global data set 108. One example simulation mechanism 102 may implement a modification of Bernstein's inequality that uses a sample variance instead of a full data set variance. According to one example implementation, when the full data set variance is significantly larger or smaller than the sample variance, using the sample variance may result in more approximate estimate for the statistic. Furthermore, computing/estimating the actual full data set variance initially involves a complete or near-complete query execution process and a set of full query results, which may be cost-prohibitive.

Confidence bounds, for example, may converge at a rate that is computed using various factors, such as any combination of the following example factors: a count of data items/rows in the sample, a size of the sample, a variance of the full data set, minimum and/or maximum hypotheses for the full data set and/or the like. In one example implementation, a confidence bound size increases in relation to the sample variance and decreases in relation to a square root of the sample size or, alternatively, the count of data items/rows.

The simulation mechanism 102 may utilize known estimation techniques to compute the uncertainty statistics and/or predict a final/complete set of results. These techniques may support such a prediction based upon one or more summary statistics associated with the representative sample. For example, the confidence bounds may be estimated using the representative sample size, which may be scaled to a larger size, instead of another metric, such as a full data set size. The user may, as an option, specify a minimum probability (e.g., 95%) regarding confidence bound credibility. Such a probability represents a threshold for the confidence bound to satisfy and may be known as a margin of error, likelihood and/or the like.

In order to measure a degree to which the user interacts with the enterprise-level data store via incremental visualization, the simulation mechanism 102 provides a same or similar experience to enable, among other advantages, exploration of the structured enterprise data in the enterprise-level data source and/or experimentation with a given management system associated with the enterprise-level data store.

The simulation mechanism 102 may train model data 116 (e.g., a prediction model) for each statistical estimator by correlating the user activity data 114 with confidence bound estimates for a progression/distribution of partial results. The model data 116 may predict future user activity regarding the enterprise-level data store. At least a portion of the model data 116 may indicate that, in some example implementations, the confidence bounds change at different rates, which may be used to simulate different enterprise-level data store configurations. The simulation mechanism 102 may be configured to learn each enterprise-level data store configuration's convergence properties to improve future simulation of the configuration and/or to standardize query execution parameters, which restricts data set searching to maximizing the potential for user interactivity. An example embodiment of the model data 116 may include the standardized parameter data configured to combine incremental database query execution with visualization enhancements to provide a manageable progression of corresponding visual representations that balance benefits of rapid, generally less accurate query/search results and slow, generally more accurate query/search results.

The simulation mechanism 102 may monitor user interactions with the interface and measure user behaviors in response to query response data 118. One example implementation of the query response data 118 may include virtual query responses that purport to be actual query responses provided by the enterprise-level data store. Each virtual query response may include results data with related uncertainty statistical data for one portion of the sample data 110 being searched. For instance, the simulation mechanism 102 may return an example virtual query response comprising extracted tabular data that satisfies an example distributed query and two additional columns storing a corresponding confidence interval/bound (e.g., a 95% confidence interval/bound) for each data value. As described herein, the confidence bound may refer to a range of values within which a true value exists in relation to the global data set 108 and/or a remainder of the sample data 110.

One or more example implementations may periodically retrieve additional data from the global data set 108 for storage in the sample data 110. According to one such implementation, by updating the representative sample(s), the example system exposes a larger portion of the global data set 108 to the simulation, which results in more accurate statistical data for the user to peruse.

Embodiments of the example system depicted in FIG. 1 may provide simulated query execution\searching of an incremental database system that is implemented, for example, at terabyte scale. Providing a realistic experience allows the users to become acclimated with operating such a system and/or enables accurate assessment of the user activity data 114 in response to the partial results.

With respect to embodiments where the enterprise-level data store cannot perform incremental query execution, the simulation mechanism 102 may, nonetheless, use the sample data 110 to support user interaction with the incremental visualizations. Alternatively, the simulation mechanism 108 may be able to interactively execute complete database queries over an entire full dataset, collect metadata and/or compare the statistical data estimates with ground truth results.

Figure 2:
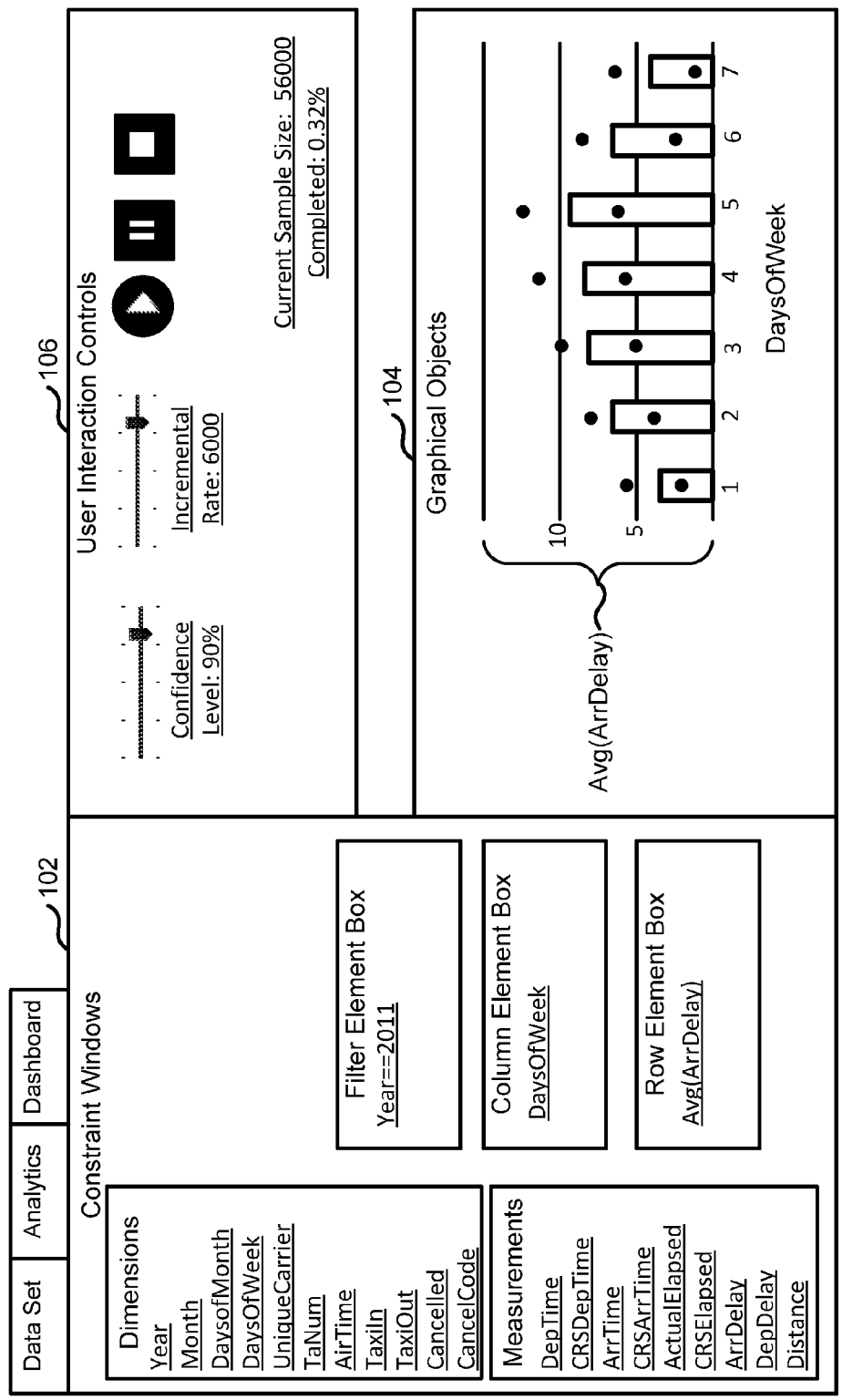
FIG. 2 illustrates an example embodiment of a front-end interface to an incremental visualization simulation mechanism according to one example implementation.

FIG. 2 illustrates an example embodiment of a front-end interface for providing incremental visualization for structured data in an enterprise-level data store according to one example implementation. The front-end interface may present, via a computer/visual display, various graphical user interface elements (e.g., the interface element(s) 112 of FIG. 1) facilitating the incremental visualization of partial query results. Each interface element may include a visual representation rendered by a simulation mechanism (e.g., the simulation mechanism 102 of FIG. 1). An example user may manipulate some interface elements known as controls to interact with the front-end interface. These interface elements may include, for example, query/search constraint windows 202, graphical objects 204, user interaction controls 206 and/or the like.

The front end interface may be configured to formulate queries (e.g., incremental or non-incremental queries), which may be accomplished program and will programmatically (e.g., an SQL statement) or non-programmatically (e.g., visually). The front-end interface enables execution of aggregate queries (e.g., averages, sums, counts and/or the like), which may be typically used in an exploratory data analysis. The user may instruct the front-end interface to access database tables and, without any knowledge of an underlying query language, generate visual summaries using various query-related features, such as filter, sort, group and/or the like. The user may operate any of these features via the interface elements described herein.

In one example implementation, an initial screen allows users to connect to an SQL server, select a table from an available database and open a dashboard application through which statistical analytics may be performed. FIG. 2 illustrates an example analytics panel comprising the constraint windows 202 through which users input constraint data for composing queries (e.g., aggregate queries). As described herein, the constraint windows 202 may accept one or more search/query constraints of which the front-end interface combines into an example visually formulated query that, when executed on a data set, cause the data store to search structured enterprise data stored therein for specific information that matches the one or more search/query constraints.

For example, the user may drop/add one or more dimensions and/or one or more measures onto a column box element and/or a rows box element, respectively, of the constraint windows 202. Each measure may constrain a search to a specific data item or set of data items operating as an index to results data. Each dimension may constrain the search to a specific component (e.g., a category, an analytic or a perspective) of the measure. The one or more dimensions may partition the measure into different components. As another example, the constraint windows 202 may include a filter box element to allow the user to create a filter constraint on a set of dimensions and/or a set of measures. As an example, the user may issue a query over an airline flight database for flight delay related data sets in order to determine an average flight arrival delay by day of the week (e.g., Sunday) and/or for a specific year (e.g., 2006).

A data set or dataset, as described herein, may generally comprise structured enterprise data according to various types, such as a collection of database tables, in which stored data values (e.g., measures) for data items may be organized into dimensions (e.g., categories). Each stored data value may express some form of a measurement associated with a specific data item (e.g., a data row). The data set may be refined from a larger data set by specifying filters (e.g., data value constraints) in each data item in the data set match the filtered values. For example, the incremental visualization system may generate a bar chart depicting average purchase amounts in dollars (e.g., a measure) for each customer (e.g., data items) that may be further divided into different products (e.g., dimensions) and/or further refined by only including customers who belong to a certain demographic (e.g., senior citizens).

As an example, a user may use the constraint windows 202 to formulate a multi-dimensional histogram query where a first constraint specifies one or more measures to a select, a second constraint specifies a data set to search, a third constraint specifies a condition to filter the data set and a fourth constraint defines a visual impression of a resulting query response. One example multi-dimensional histogram query may create a table with two columns <G1, G2> in which each row comprises a computed aggregate value (e.g., a mean, a sum, a count and/or the like) for each column and satisfies a certain Boolean condition, according to the following example format:

```
SELECT <G1,G2>, MEAN/SUM/COUNT (*) FROM
    <Table> WHERE <Condition> GROUP BY
    <G1,G2>
```

The visualization techniques discussed herein may render the graphical objects 204 having a number of common features, (e.g., use of data set ranges). Some of the graphical objects 204 include visual representations of various statistical information, such as uncertainty statistical data, which may be rendered on the front-end interface as an extra dimension: error bars, fuzz zones, and uncertainty-encoded glyphs take up additional space on the screen. The uncertainty statistical data (e.g., uncertainty level) may be measured for an entire full data set instead of per data item or per representative sample. For example, the uncertainty statistical data may be derived from information associated with the full data set, such as a total size (e.g., in data rows), a skew and/or the like.

According to one example implementation, the graphical objects 204 may display aggregated measurements for at least a portion of a full data set via, for example, a column chart or any other type of histogram. The front-end interface may annotate the column chart with one or more types of graphical indicia, for example, denoting an estimated data value for a true aggregated measurement corresponding to the full data set (e.g., a population). One example type may include confidence bound indicia for an interval of data values that are likely to include the true aggregated measurement. As illustrated in FIG. 2, the front-end interface may express the confidence bound indicia as error bars that may be located proximate to each column. Error bars generally denote a range/interval of likely data values for the true measurement based upon a specific estimator and within a particular statistical confidence level; and a column height indicates a current estimate of the measurement. The error bars around resulting column chart data values denoting corresponding confidence bounds may be adjusted to reflect incremental data from a larger representative sample.

As depicted through the error bars, FIG. 2 indicates—with a 90% confidence level/probability—that an interval between six (6) and twelve (12) minutes includes a true average delay for airline flight arrivals on Friday (day=5) in all of 2011 while on Saturday (day=6) between an interval between two (2) and eight (8) minutes includes the true average delay. The interval on Friday, for example, may be computed using an estimated true average delay of nine (9) minutes and an area under a normal density curve corresponding to the 90% statistical confidence level. These confidence bounds are computed by executing a related query on 56000 data rows, which comprises only 0.32% of the full data set. A next iteration of the query adds 6000 more data rows to the sample size, which may modify the confidence bound indicia to denote different intervals in which the true average delay lies at the statistical confidence level of 90%.

The simulation mechanism may pass incremental data, such as histogram data, to the front-end interface, which in turn, renders a replacement histogram visual representation for a current histogram visual representation being displayed via the front-end interface. The replacement histogram visual representation may reflect updated database query results data due to more available structured enterprise data (e.g., table data rows) being processed. As an alternative to an entire histogram, the simulation mechanism may communicate incremental histograms (e.g., table data that represents only the difference from a previous point-in-time) to the front-end interface.

Example user interaction controls 206 may include input controls for various parameter data, such as search parameters for a data store. According to one example implementation, the search parameters may configure the data store to simulate searching an enterprise-level data store for a data set that matches a query. The user interaction controls 206 may also include one or more interface elements configured to manage the simulation of database query execution. One example interface element may control a rate at which the front-end interface updates current results data with additional search results. Utilizing this example interface element may cause the simulation process to stop and/or restart. Alternatively, a separate interface element may start/pause/terminate the simulation process. The separate interface element also may issue additional queries while at least one database query execution simulation continues to run. The front-end interface may continue to grow the sample data.

Another example interface element may control the visualization processes associated with iteratively presenting results data when executing the query against portions of a global data set. According to one example implementation, statistical information, such as data points of a histogram, may be updated periodically (e.g. every second) with refined estimates in response to the additional search results.

Joining a restrictive database query with a representative sample of structured enterprise data from the enterprise-level data store, according to one example implementation, may result in a manageable or credible set of results (e.g., table data rows) for estimating statistical data, such as uncertainty statistics. One or more example implementations may enhance statistical data estimates with supplemental information from the global data set beyond sampled data values, such as full data set size/skew. Because two or more statistical estimation techniques may utilize different aspects of the full data set to measure partial query result uncertainty, one example estimator (e.g., Bernstein's inequality probability theorem) may use a priori known information to compute accurate confidence bound estimates while a second example estimator (e.g., a large-sample bound estimator employing the central limit theorem) may only use a stream comprising an incomplete set of query responses. The a priori known information may include, but is not limited to, a combination of any of the following: a priori known minimum and/or maximum data value(s), data set variance, sample variance, a full data size and/or the like.

In addition to the error bars, some example implementations may generate other example graphical objects 204 in accordance with incremental visualization related parameter data. One representative interface element may display various search-related statistics, such as a number of data rows traversed thus far and a percentage of a full/global dataset that the number data rows may represent. One example implementation may indicate, via an interface element, a number of data values being used to estimate a statistical datapoint, such as an aggregate sum. Another example implementation may present the user with an illustrative interface element (e.g., an interactive timeline) that memorializes changes to a confidence bound estimate over a given time period (e.g. during database query execution), which may infer an appropriate sample size to terminate the incremental visualization instead of waiting for additional data rows to be searched.

Figure 3:
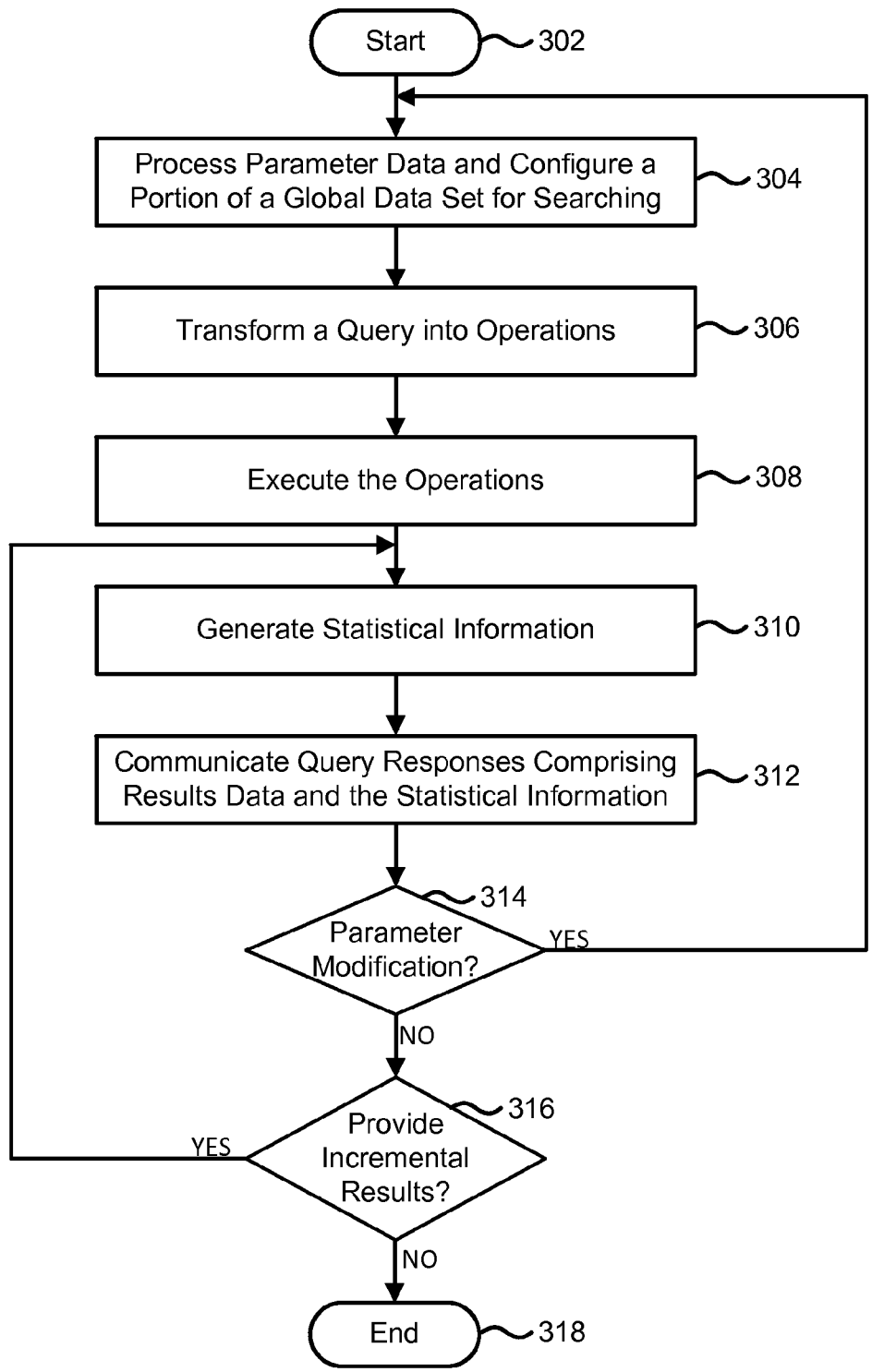
FIG. 3 is a flow diagram illustrating example steps for simulating incremental visualization of a global data set according to one example implementation.

FIG. 3 is a flow diagram illustrating example steps for simulating incremental visualization of a global data set according to one example implementation. One or more of the example steps may be performed by a simulation mechanism (e.g., the simulation mechanism 102 of FIG. 1). The example steps commence at step 302 and proceed to step 304 at which the simulation mechanism processes parameter data for configuring a portion of a global data set for searching.

As instructed via the parameter data, the simulation mechanism may use a back-end data store to identify a representative sample by identifying a portion of the global data set having a same or statistically similar confidence bound as a current estimate (e.g., a best estimate) of a global data set confidence bound, according to one example implementation. Even if the global data set continues to store enterprise data and grow in size, the representative sample may remain useful and accurate.

The simulation mechanism may configure the back-end data store to approximate cloud computing environment functionality that incrementally executes database queries across many storage machines (e.g., servers). The simulation mechanism may generate query responses that resemble individual results computed by each back-end storage machine. These query responses may include virtual confidence bounds for the back-end storage machines that are combined to compute aggregated confidence bounds.

A system/machine implementing the simulation mechanism may select, at least in part, sample data from hypothetical/standardized table data. For example, the simulation mechanism may identify one or more representative samples that, when visualized incrementally via the interface, may bring about certain errors/problems, specific use cases, other scenarios and/or the like. The user, for instance, may engage in a simulation involving testing incremental visualization capabilities and/or experimenting with different parameters, such as different combinations of operating modes, data store architectures, statistical estimation techniques, data set search configurations and/or the like.

Step 306 is directed to transforming the query into operations that enable incremental visualization simulation. Step 308 represents execution of the operations on structured data representing the portion of the global data set. To illustrate an example incremental visualization process using query execution simulation, when a query is issued, the front-end interface communicates the query to the back-end data store, which computes and returns data values representing a partial or incomplete result and/or corresponding confidence bounds. Some example data values may estimate statistical properties, such as a mean, a sum, other applicable aggregate measures and/or the like. One example implementation may return only the data values that represent differences between the partial result and a previous partial result for the same query. For instance, the data store may reply with information indicating changed, added and/or deleted data values since a most recent incremental visualization of query-related results.

Step 310 refers to generating statistical information corresponding to query results data. The back-end data store may generate query responses for the front-end interface. In one example implementation, the query responses may include statistical data, including a current sample size, confidence bounds and other uncertainty statistics, and/or the like, in addition to a partial result from query execution. The partial result may typically include data values that satisfy the query constraints (e.g., filters, groups, measures and/or the like) and in which a representative global data set sample contributed to computing at least a portion thereof. The confidence bound, in one example implementation, may define a range of data values for a measurement type that corresponds with a specific statistical confidence level (e.g., ninety-five (95) %). An example confidence bound may typically include approximations of a data set's true highest value and true lowest value.

In one example implementation, the back-end data store may rely on unbiased, representative samples (e.g., random samples) to compute statistically accurate confidence bounds. In another example implementation, the back-end data store may compile a partial result by selecting incremental data from a randomly-ordered stream representing the global data set. In one example implementation, the back-end data store may extract the incremental data from a second stream that may be structured in a variety of ways. The second stream may be generated in accordance with an ordering of the global data set as structured on a hard disk or a virtual disk.

Step 312 communicates query responses comprising results data and the statistical information to for display on the front-end interface being presented to the user, via a display device. The front-end interface processes the data values and, via a computer display, presents a histogram summarizing results data. One example implementation may merge a progression of partial results into a single set of query-related results that comply with search parameters (e.g., a desired sample size). Another example implementation may create the results data by modifying, inserting and/or deleting data values in a set of current results. Yet another example implementation may update the set of current results with new data value estimates (e.g., confidence bounds) and/or incremental data representing some recent changes to the representative sample.

The simulation mechanism may equip the user with functionality for developing and/or experimenting with new/improved/alternative visualization techniques. According, the user may modify the parameter data before a complete set of query results is produced. Step 314 determines whether the user modified the parameter data using the interface. If the user so interacted with a current incremental visualization simulation process, step 314 returns to step 304. If the parameter data remains unchanged, step 314 proceeds to step 316. Step 316 determines whether to provide incremental results to update the results data currently being displayed on the interface. If the simulation mechanism decides to return the incremental results, step 316 returns step 310. If no more results are to be provided because the incremental visualization simulation process completed and/or the simulation mechanism halted and/or stopped the incremental visualization simulation process, step 316 proceeds to step 318 and terminates the example steps depicted in FIG. 3.

Figure 4:
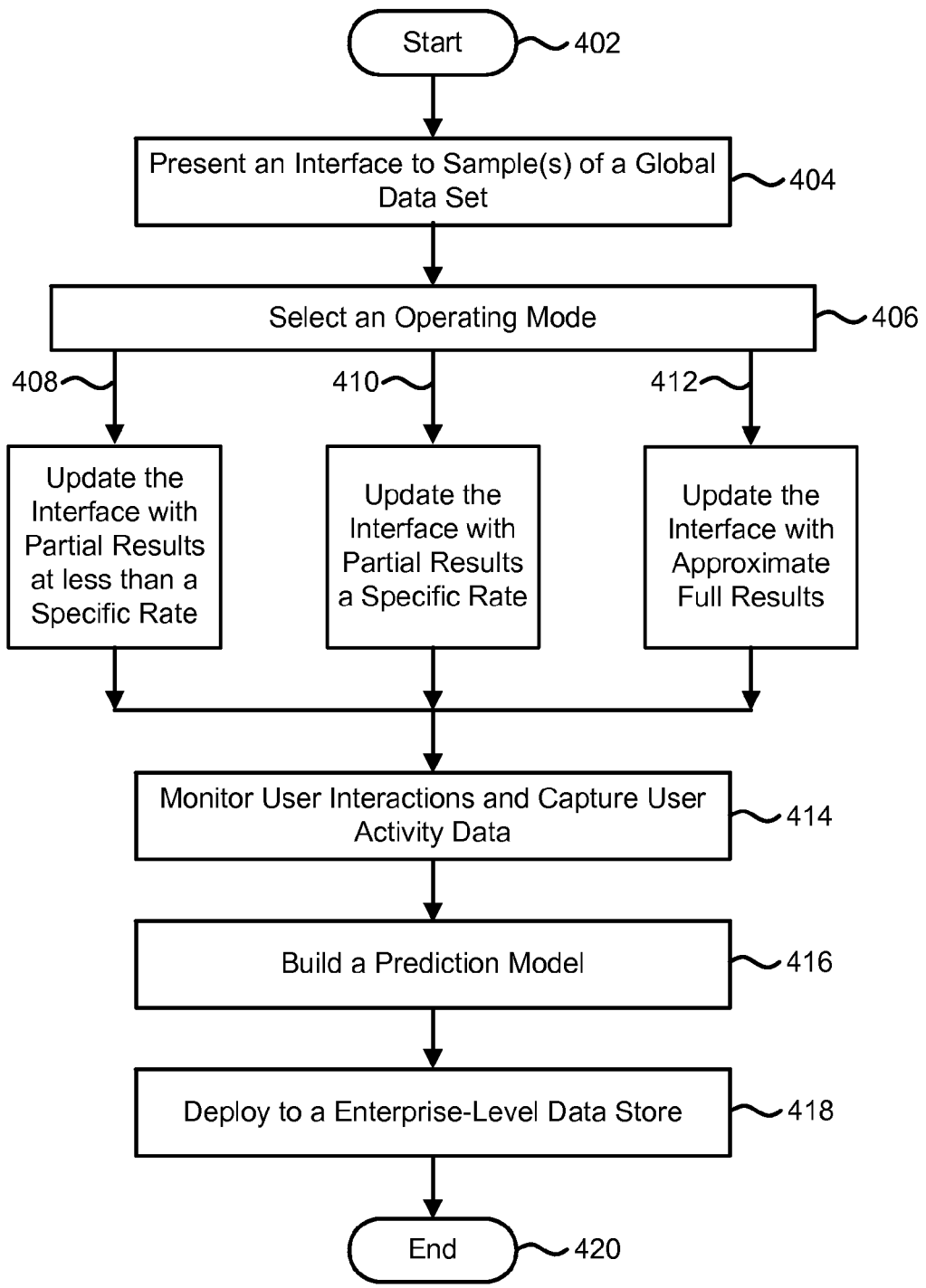
FIG. 4 is a flow diagram illustrating example steps for monitoring user interaction with an interface to results data according to one example implementation.

FIG. 4 is a flow diagram illustrating example steps for monitoring user interaction with an interface to results data according to one example implementation. One or more of the example steps may be performed by a front-end interface (e.g., the interface 104 of FIG. 1), a simulation mechanism (e.g., the simulation mechanism 102 of FIG. 1) and/or a combination thereof. The simulation mechanism and the front-end interface cooperate to enable visualization of and/or interaction with real-time incremental results from dynamic queries across an enterprise-level data store or a data store emulating the enterprise-level data store. The example steps commence at step 402 and proceed to step 404 at which the front-end interface for searching a sample of a global data set (e.g., the global data set 108 of FIG. 1) is presented, via a computer display, to a user.

According to one example implementation, obtaining a representative and/or random sample from the global data sets may provide an advantage when monitoring user interactions. Because such a sample has a distribution that is statistically similar, any user activity in response to viewing results data based upon the sample is likely to accurate reflect actual user activity that may occur in a real-world, enterprise-level data store.

Step 406 performs an operating mode selection corresponding to simulating query execution performed by an enterprise-level data store. Step 408 represents a first operating mode where the front-end interface is updated with a partial result at less than a specific rate. Step 410 represents a second operating mode where the front-end interface is updated, at or near the specific rate, with the partial result. Step 408 represents a third operating mode where the front-end interface is updated with an approximate full result. If, for example, step 406 selects the first operating mode and proceeds to step 408, the front-end interface may produce a rendered histogram that is based upon the partial result and displayed at a rate less than, or substantially less than, a pre-defined top speed commonly associated with the enterprise-level data store. If, as another example, step 406 selects the second operating mode and proceeds to step 410, the front-end interface may display the rendered histogram at a rate equal to, or substantially equal to, the pre-defined top speed.

Alternatively, step 406 may select the third operating mode and proceed to step 412, the front-end interface may produce a rendered histogram that is based upon the approximate full result. One example implementation may generate a partial result on behalf of each (simulated) back-end storage machine that the front-end combines into a full data set result.

By way of example, the third operating mode may approximate a global data set sum after computing a sum of a representative sample and extrapolating the computed sum to match a size of the global data set. The simulation mechanism may emulate an example back-end storage machine by generating virtual query response data comprising the representative sample sum and/or a value indicating a proportion of the representative sample size to the global data set size. The simulation mechanism may aggregate virtual sums from the simulated back-end machines and generate a value purporting to be the global data set sum across an enterprise-level data store. The simulation mechanism replies to the front-end interface running on the user computer with the virtual sums manifested as a genuine distributed database query response.

The simulation mechanism may compute other statistics from the representative samples. For each example representative sample, the simulation mechanism may generate various statistical properties, such as standard deviations, and/or statistical analysis-related information, such as a set of error bounds that are computed based on the standard deviation of the sample. Computational elements of the front-end interface may process and combine the virtual sums into an approximate sum of a complete, full data set comprising structured enterprise data.

Step 414 is directed to monitoring user interactions with the front-end interface and capturing user activity data for further examination. During the query execution simulation, one or more front-end interface elements may provide the user with uncertainty statistical data corresponding to a current set of query results. By monitoring the user interactions with the front-end interface elements, the simulation mechanism and/or the front-end interface may determine whether an example data-intensive user would be willing to make a decision on the fly using incremental visualization. The front-end interface also may capture the user activity data in response to the uncertainty statistical data, such as confidence bounds.

Accordingly, in one example implementation, the front-end interface may be configured to recognize acceptable confidence bounds for performing enterprise-level tasks. The simulation mechanism and/or the front-end interface may render a decision as to when a particular interval between data items become acceptable as a confidence bound and/or further, when the confidence bound becomes a credible information source during enterprise decision making.

Step 416 refers to building a prediction model for future user activity with respect to the enterprise-level data store. While the prediction model may be specific to a particular user, the prediction model may not be specific to a specific data set (e.g., the global data set 108 of FIG. 1) and therefore, reflect user behavior across a number of data sets. In one example implementation, the prediction model may identify the acceptable confidence bounds for enterprise-level decision making as described herein. The prediction model may be trained by correlating the user activity data with statistical uncertainty estimates. The prediction model may include learned convergence properties for these estimates.

In one example implementation, given a stream comprising sample data, the simulation mechanism and/or the front-end interface may estimate an expected value for an aggregate measurement, such as a mean or a variance. As more sample data continues to stream, the expected value is re-computed to reflect a more precise aggregate measurement. At some point, the user may decide to issue another query, terminate the present query and/or both because most likely the expected value is a credible estimate of a true value for the aggregate measurement and the current set of results data may be sufficient for the user's information need. Therefore, any additional query execution may be rendered extraneous and unnecessary. The other query, for instance, may request a related, but different set of results for answering a follow-up question from the set of current results for the present query. The prediction model may store the expected value that proximately corresponds to the user's decision.

The prediction model also may include standardized parameter data for controlling incremental visualization for the query execution to maximize efficiency and productivity through user interactivity. Step 418 deploys the prediction model and/or the standard parameter data to the enterprise-level data store. Step 420 terminates the example steps depicted in FIG. 4.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 5:
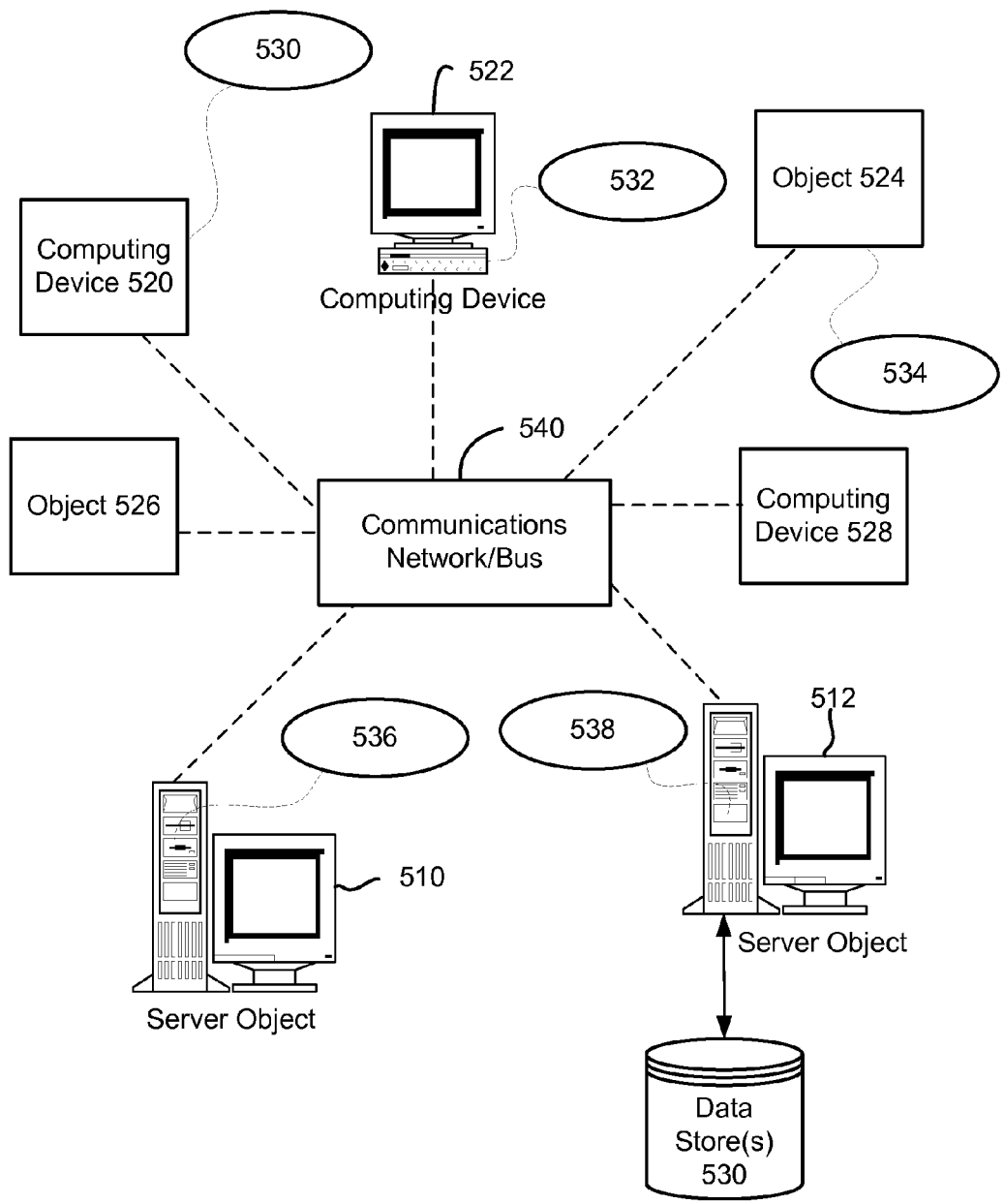
FIG. 5 is a block diagram representing example non-limiting networked environments in which various embodiments described herein can be implemented.

FIG. 5 provides a schematic diagram of an example networked or distributed computing environment. The distributed computing environment comprises computing objects 510, 512, etc., and computing objects or devices 520, 522, 524, 526, 528, etc., which may include programs, methods, data stores, programmable logic, etc. as represented by example applications 530, 532, 534, 536, 538. It can be appreciated that computing objects 510, 512, etc. and computing objects or devices 520, 522, 524, 526, 528, etc. may comprise different devices, such as personal digital assistants (PDAs), audio/video devices, mobile phones, MP3 players, personal computers, laptops, etc.

Each computing object 510, 512, etc. and computing objects or devices 520, 522, 524, 526, 528, etc. can communicate with one or more other computing objects 510, 512, etc. and computing objects or devices 520, 522, 524, 526, 528, etc. by way of the communications network 540, either directly or indirectly. Even though illustrated as a single element in FIG. 5, communications network 540 may comprise other computing objects and computing devices that provide services to the system of FIG. 5, and/or may represent multiple interconnected networks, which are not shown. Each computing object 510, 512, etc. or computing object or device 520, 522, 524, 526, 528, etc. can also contain an application, such as applications 530, 532, 534, 536, 538, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 5, as a non-limiting example, computing objects or devices 520, 522, 524, 526, 528, etc. can be thought of as clients and computing objects 510, 512, etc. can be thought of as servers where computing objects 510, 512, etc., acting as servers provide data services, such as receiving data from client computing objects or devices 520, 522, 524, 526, 528, etc., storing of data, processing of data, transmitting data to client computing objects or devices 520, 522, 524, 526, 528, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 540 or bus is the Internet, for example, the computing objects 510, 512, etc. can be Web servers with which other computing objects or devices 520, 522, 524, 526, 528, etc. communicate via any of a number of known protocols, such as the hypertext transfer protocol (HTTP). Computing objects 510, 512, etc. acting as servers may also serve as clients, e.g., computing objects or devices 520, 522, 524, 526, 528, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 6 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 6:
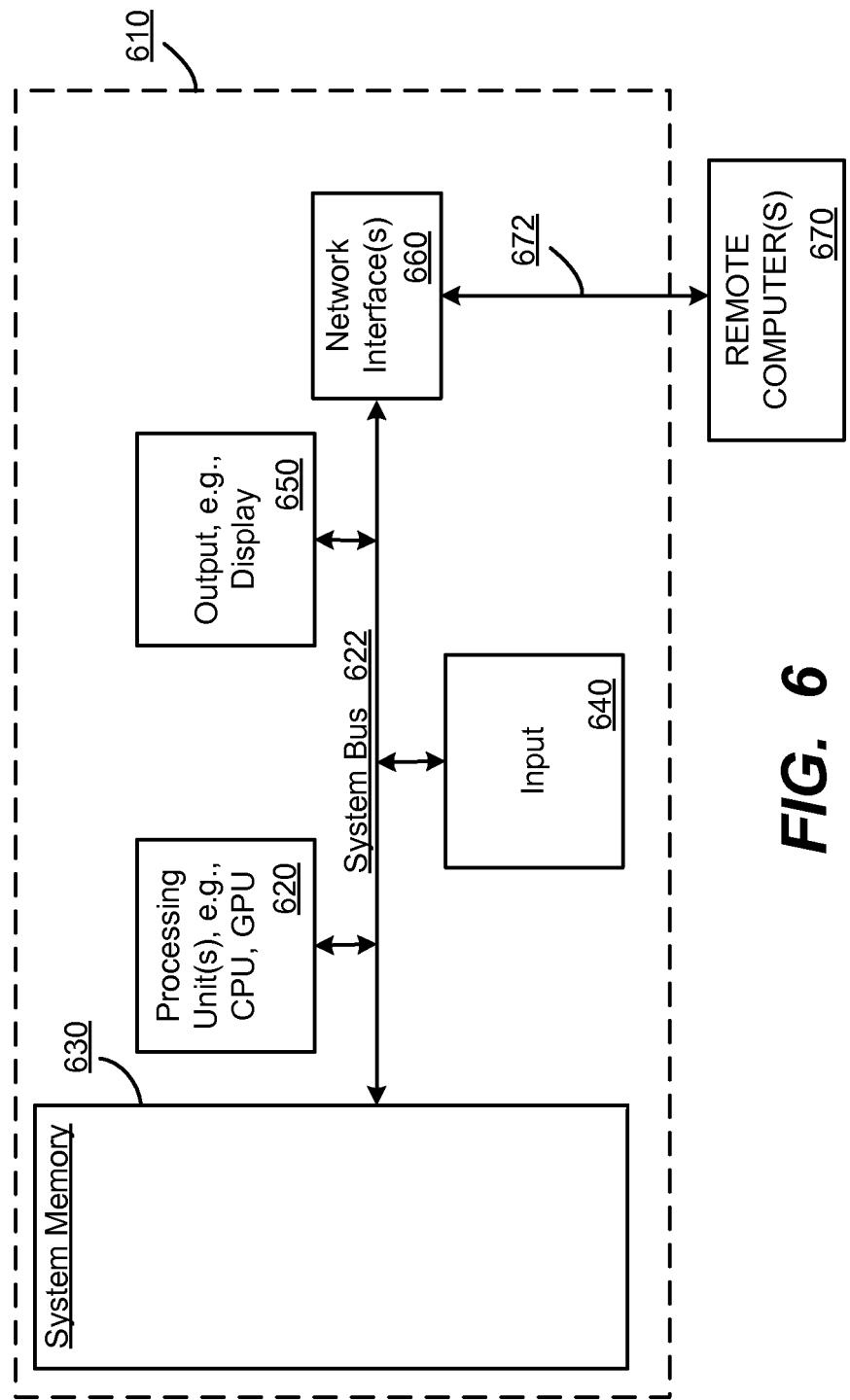
FIG. 6 is a block diagram representing an example non-limiting computing system or operating environment in which one or more aspects of various embodiments described herein can be implemented.

FIG. 6 thus illustrates an example of a suitable computing system environment 600 in which one or more aspects of the embodiments described herein can be implemented, although as made clear above, the computing system environment 600 is only one example of a suitable computing environment and is not intended to suggest any limitation as to scope of use or functionality. In addition, the computing system environment 600 is not intended to be interpreted as having any dependency relating to any one or combination of components illustrated in the example computing system environment 600.

With reference to FIG. 6, an example remote device for implementing one or more embodiments includes a general purpose computing device in the form of a computer 610. Components of computer 610 may include, but are not limited to, a processing unit 620, a system memory 630, and a system bus 622 that couples various system components including the system memory to the processing unit 620.

Computer 610 typically includes a variety of computer readable media and can be any available media that can be accessed by computer 610. The system memory 630 may include computer storage media in the form of volatile and/or nonvolatile memory such as read only memory (ROM) and/or random access memory (RAM). By way of example, and not limitation, system memory 630 may also include an operating system, application programs, other program modules, and program data.

A user can enter commands and information into the computer 610 through input devices 640. A monitor or other type of display device is also connected to the system bus 622 via an interface, such as output interface 650. In addition to a monitor, computers can also include other peripheral output devices such as speakers and a printer, which may be connected through output interface 650.

The computer 610 may operate in a networked or distributed environment using logical connections to one or more other remote computers, such as remote computer 670. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 672, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one processor, comprising, simulating query execution to provide incremental visualization for a global data set, including, processing parameter data for controlling incremental visualization of query execution on the global data set, executing operations on at least a portion of the global data set, providing partial results in accordance with the parameter data, and providing statistical information including uncertainty information, corresponding to using the partial results as a credible estimate of full query results on the global data set.

2. The method of claim 1 further comprising presenting a visual representation associated with the partial results and the statistical information via an interface.

3. The method of claim 1, wherein generating the statistical information further comprises computing uncertainty statistical data for the partial results, and displaying the uncertainty statistical data via an interface.

4. The method of claim 1 further comprising monitoring user interactions with interface elements associated with presenting at least a portion of the partial results.

5. The method of claim 1, wherein executing the operations further comprising transforming a visually formulated query into the operations associated with searching a data store.

6. The method of claim 1, wherein executing the operations further comprising executing a distributed query for searching the portion of the global data set that is maintained by virtual storage machines.

7. The method of claim 1, wherein providing the statistical information further comprises producing confidence bound indicia associated with the partial results, rendering a visual representation on an interface element comprising the partial results and the statistical information, and coupling the visual representation with the confidence bound indicia.

8. The method of claim 1 further comprising updating the partial results with incremental data.

9. The method of claim 1, wherein providing the partial results further comprises calibrating presentation of the partial results after modifying the parameter data.

10. The method of claim 1, wherein providing the partial results further comprises generating virtual response data for each storage machine of an emulated enterprise-level data store.

11. The method of claim 1 further comprising identifying a representative sample for the structured enterprise data within the global data set.

12. The method of claim 1, wherein providing the partial results further comprises emulating an enterprise-level data store comprising the global data set.

13. In a computing environment, a system comprising, at least one processor, a memory communicatively coupled to the at least one processor and including components configured to execute on the at least one processor and comprising, a simulation mechanism configured to operate between a front-end interface and a back-end data store, the front-end interface configured to communicate queries to the simulation mechanism, the back-end data store configured to store structured data representing at least one sample of a global data set, the simulation mechanism further configured to interpret the queries and instruct the back-end data store to produce incremental data, the front-end interface further configured to produce a visual representation of a current set of query results comprising the incremental data, and the simulation mechanism further configured to compare the current set of query results with at least one prior uncertainty statistic estimate based on a previous set of query results, the at least one prior uncertainty statistic estimate comprising an estimated data value for a true aggregated measurement corresponding to the global data set.

14. The system of claim 13, wherein the simulation mechanism is further configured to instruct the front-end interface to generate a set of interface elements for expressing a progression of visual representations.

15. The system of claim 13, wherein the simulation mechanism is further configured to control incremental visualizations associated with the current set of query results based upon parameter data.

16. The system of claim 13, wherein the simulation mechanism is further configured to generate an approximate full query result using the at least one sample.

17. The system of claim 13, wherein the simulation mechanism is further configured to estimate a confidence bound based upon the current set of results.

18. The system of claim 13, wherein the simulation mechanism is further configured to modify a sample size associated with the global data set.

19. One or more computer-readable media having computer-executable instructions stored thereon, which in response to execution by a computer, cause the computer to perform steps comprising:
  rendering interface elements for a computer display;
  selecting a mode for displaying a progression of visual representations via the interface elements while iterating a query execution simulation;
  capturing user activity data corresponding to the progression of visual representations, the user activity data comprising decisions regarding real-time query execution;
  building a prediction model by correlating the user activity data with iterations of an uncertainty estimate in which at least one iteration is associated with presenting partial query results via incremental uncertainty visualization and the uncertainty estimate corresponds to the credibility of the partial query results; and
  deploying the prediction model to an enterprise-level data store.

20. The one or more computer-readable media of claim 19 having further computer-executable instructions, which in response to execution by the computer, cause the computer to perform further steps comprising:
  configure a data store to emulate an enterprise-level data store comprising structured enterprise data.

* * * * *